United States Patent [19]

Gibbs

[11] 4,186,156

[45] Jan. 29, 1980

[54] CRYSTALLIZABLE VINYLIDENE CHLORIDE POLYMER POWDERS AND ACRYLIC FIBERS CONTAINING SAME

[75] Inventor: Dale S. Gibbs, Midland, Mich.

[73] Assignee: The Dow Chemical Company, Midland, Mich.

[21] Appl. No.: 942,513

[22] Filed: Sep. 15, 1978

[51] Int. Cl.² ............................................. C08L 33/20
[52] U.S. Cl. ............................... 529/78; 260/29.6 RB; 260/30.8 DS; 260/32.6 N; 260/DIG. 24; 525/86
[58] Field of Search ................... 260/879, 881, 876 R, 260/898

[56] References Cited

U.S. PATENT DOCUMENTS

| | | | |
|---|---|---|---|
| 2,949,437 | 8/1960 | Hobson | 260/45.5 |
| 3,288,888 | 11/1966 | Wieckowski | 260/898 |
| 3,963,790 | 6/1976 | Couchoud | 260/898 |
| 4,081,498 | 3/1978 | Maranci | 260/898 |
| 4,101,621 | 7/1978 | Yamamoto et al. | 260/881 |
| 4,145,380 | 3/1979 | Myers et al. | 260/879 |

Primary Examiner—William F. Hamrock
Attorney, Agent, or Firm—T. R. Wills

[57] ABSTRACT

A crystallizable vinylidene chloride polymer powder is recovered from a latex obtained by emulsion polymerizing in sequence (a) a first monomer mixture comprising a predominant amount of vinylidene chloride and an ethylenically unsaturated comonomer which is copolymerizable therewith, such as acrylonitrile; (b) a minor amount of a polyfunctional monomer for providing graft sites on the product of (a); and (c) a second monomer mixture which is predominantly acrylonitrile, the amount of the second monomer mixture being in the range of about 10 to about 25 percent of the weight of the first monomer mixture. The so-formed solvent is admixed with an acrylic polymer and a suitable solvent and then spun into fibers having improved flame-retardancy.

13 Claims, No Drawings

CRYSTALLIZABLE VINYLIDENE CHLORIDE POLYMER POWDERS AND ACRYLIC FIBERS CONTAINING SAME

BACKGROUND OF THE INVENTION

The present invention relates to flame-retardant acrylic fibers and, more particularly, to acrylic fibers containing vinylidene chloride polymers.

Acrylic fibers, i.e., those containing at least 85 weight percent acrylonitrile, are well known in the art and widely used in commercial textile manufacture due to their excellent physical properties. However, such fibers have the distinct disadvantage that they ignite rather easily upon exposure to flames or high temperatures. Attempts to remedy this deficiency have been many and varied. For example, copolymerization of acrylonitrile with a halogen-containing monomer such as vinylidene chloride has resulted in fibers having considerably improved flame resistance. Typically, however, such copolymer fibers (generally classed as modacrylic fibers) also exhibit reduced sticking temperature and high shrinkage at elevated temperatures, such as upon exposure to boiling water or steam.

In order to provide a better balance between flame-retardancy and other desirable physical properties, attempts have also been made to blend various copolymers of acrylonitrile. For example, U.S. Pat. No. 3,963,790 is directed to a flame-resistant fiber wherein at least 50 weight percent of the fiber is a copolymer of about 79.5 to about 58 weight percent of acrylonitrile, 20 to 40 weight percent vinylidene chloride and 0.5 to 2 weight percent of a comonomer which enhances dyeability and 1 to 50 weight percent of the fiber is a second copolymer of 20 to 50 weight percent of acrylonitrile and 50 to 80 weight percent of vinylidene chloride. Inasmuch as such fibers consist of no more than a blend of two modacrylic fiber-forming polymers, it is inherent that they cannot be expected to exhibit the excellent properties of acrylic fibers.

Other attempts at providing flame-retardant acrylic fibers have involved the use of a variety of extraneous additives, such as antimony oxides, halogenated paraffins, hologenated hydrocarbons, and low molecular weight phosphate esters. It could be expected that only moderate decrease in beneficial physical properties would result if a minor amount of such an additive were dispersed throughout the continuous phase of an acrylic fiber structure. However, it has been the typical experience that effective utilization of these additives has undesirably required their presence in rather high concentrations.

It is, therefore, an object of the present invention to provide a flame-retardant acrylic fiber by utilizing an additive whose presence would only moderately affect the desirable inherent physical properties, such as high sticking temperature and low shrinkage, of an unmodified acrylic fiber. It is a further object to provide a novel vinylidene chloride polymer which is particularly suited for use as such an additive.

SUMMARY OF THE INVENTION

In one embodiment, the present invention provides a crystallizable vinylidene chloride polymer powder which can be incorporated into acrylic fibers as a flame-retardant additive. The powder is recovered from a latex obtained by emulsion polymerizing in sequence (a) a first monomer mixture comprising from about 85 to about 95 weight percent vinylidene chloride and about 5 to about 15 weight percent of a copolymerizable ethylenically unsaturated comonomer;

(b) a minor amount of a polyfunctional comonomer for providing graft sites on the product of (a); and (c) about 10 to about 25 weight percent, based on the weight of the first monomer mixture, of a second monomer mixture comprising about 85 to about 95 weight percent acrylonitrile and about 5 to about 15 weight percent of a copolymerizable ethylenically unsaturated comonomer, said second monomer mixture being in the range of about 10 to 25 percent of the weight of the first monomer mixture.

The particles in the resulting latex have a diameter less than about 1 micron.

In another embodiment, the present invention provides a spinning solution for the preparation of flame-retardant acrylic fibers comprising (a) a fiber-forming polymer containing at least 85 weight percent acrylonitrile; (b) a solvent for the fiber-forming polymer; and (c) a crystallizable vinylidene chloride polymer powder as hereinbefore described.

In a further embodiment, the present invention provides a process for preparing such a spinning solution by (a) forming a generally uniform dispersion of the solvent and the crystallizable vinylidene chloride polymer powder and (b) admixing the fiber-forming polymer with the so-formed dispersion.

In yet another embodiment, the present invention is directed to an acrylic fiber obtained by spinning such a solution.

DETAILED DESCRIPTION OF THE INVENTION

The fibers of the present invention are to be generally classed as "acrylic fibers" inasmuch as the fiber-forming polymer contains at least 85 weight percent acrylonitrile. Methods for preparing such fiber-forming polymers are well known in the art, as are the comonomers that can be polymerized with the acrylonitrile. Exemplary comonomers include neutral monomers such as methyl acrylate, methyl methacrylate, and vinyl acetate; and ionic monomers such as sodium styrene sulfonate, sodium methallyl sulfonate, and the vinyl pyridines.

The crystallizable vinylidene chloride polymer powders of the present invention are recovered from latices which have been prepared by polymerization in an aqueous emulsion according to processes well known in the art. The polymerization is preferably carried out by an essentially continuous, carefully controlled addition of the requisite polymerization constituents (including polymerization initiator systems if desired) to the aqueous medium.

Generally, it is preferred to start the polymerization by adding a small amount of the first monomer mixture (as defined hereinafter), or a monomer mixture which is similar in composition to the first monomer mixture, to the aqueous medium and then adding the desired polymerization initiator to form a polymeric seed latex in order to aid in the control of particle size. The aqueous medium in which the seed latex is formed will contain the necessary surfactants to form the emulsion and will generally be adjusted to the desired pH value, as is well known in the art. Following the formation of the polymeric seed latex, the remaining amount of the first monomer mixture (including initiator) is continuously added under carefully controlled conditions to the aqueous medium, thereby forming a "core" for the final polymeric product.

In accordance with the present invention, the first monomer mixture comprises about 85 to about 95, preferably about 90 to about 95, weight percent of vinylidene chloride with the remainder comprising an ethylenically unsaturated comonomer which is copolymerizable therewith. Exemplary copolymerizable ethylenically unsaturated comonomers which can be employed include the alkyl esters of acrylic and methacrylic acids such as methyl acrylate and methyl methacrylate; nitriles of ethylenically unsaturated carboxylic acids such as acrylonitrile and methacrylonitrile; and other monomers known to polymerize with vinylidene chloride. Of these, acrylonitrile is preferred.

When the polymerization of the first monomer mixture is substantially or completely finished, a minor amount of a polyfunctional comonomer is added to the polymerization vessel to provide graft sites for the subsequent polymerization of the second monomer mixture (as hereinafter defined). The actual amount of polyfunctional monomer needed to provide sufficient graft sites will depend upon the particular polyfunctional monomer used. Typically, the amount will range from about 1 to about 5 percent of the weight of the first monomer mixture.

Suitable polyfunctional monomers include 1,3-butylene glycol dimethacrylate, 1,3-butylene glycol diacrylate, 1,4-butane diol dimethacrylate, 1,4-butane diol diacrylate, allyl acrylate, allyl methacrylate, vinyl acrylate, vinyl methacrylate, and the like. A particularly preferred class of polyfunctional monomers consists of the conjugated diolefinically unsaturated monomers, such as 1,3-butadiene and the like.

Shortly after the polyfunctional monomer has polymerized, e.g., within about 1 hour after the polyfunctional monomer has been added to the polymerization vessel, the second monomer mixture (including initiator) is continuously added under carefully controlled conditions to the aqueous medium. In accordance with the present invention, the second monomer mixture comprises about 85 to about 95, preferably about 85 to about 90 weight percent of acrylonitrile with the remainder comprising an ethylenically unsaturated comonomer which is compolymerizable therewith, e.g., alkyl esters of the acrylic and methacrylic acids such as methyl acrylate and methyl methacrylate. The amount of the second monomer mixture used will generally range from about 10 to about 25, preferably from about 15 to about 20, percent of the weight of the first monomer mixture.

The diameter of the latex particles should be less than about 1 micron. Preferably, the mean particle size is in the range of about 0.1 to about 0.5 micron, with substantially all of the particles falling within that range. Latex particles having a size greater than 1 micron will have a tendency to plug a spinnerette used in the fiber-forming process and, accordingly, will generally not provide acceptable fibers.

The crystallizable vinylidene chloride polymer powders of the present invention are recovered from the resulting latices by conventional techniques, preferably by coagulating the latex and then washing and drying the coagulum to produce a fine powder. The optimum temperature for coagulation will vary depending upon the polymer composition and particularly upon the second order transition temperature thereof. Generally, the coagulation temperature will be in the range of about 50° to about 90° C., preferably from about 50° to about 70° C.

The solvent used in the spinning solution does not appear to be critical. It is expected that conventional solvents for acrylic fiber-forming polymers can be employed. Examples of such solvents include dimethyl formamide, dimethyl acetamide, dimethyl sulfoxide, and the like. The concentration of polymers in the solvent may vary, depending upon the viscosity desired, the spinning process which will be used, and other factors known to those in the art. Normally, the viscosity of the spinning solution will range from about 500 to 1000 poises. The method of forming the spinning solution, however, appears to be critical. If the fiber-forming polymer is added to the solvent prior to the addition of the vinylidene chloride polymer powder, a uniform dispersion of the latter cannot be obtained in a reasonable period of time. In contrast, if the vinylidene chloride polymer powder is added to the solvent first, it can be readily dispersed in less than 30 minutes.

In accordance with the present invention, the spinning solution is spun into fibers by processes well known in the art. The resulting acrylic fibers will contain an effective flame-retarding amount of the vinylidene chloride polymer powder. Generally, the amount will range from about 35 to about 45 percent of the weight of the fiber. Stated differently, it is desirable that the resulting fiber have a chlorine content of at least about 20 percent, preferably from about 20 to about 30 percent.

It will be understood that the fibers of the present invention may contain further modifying ingredients such as heat and light stabilizers, plasticizers, antistatic agents, lubricants, optical brightners, conventional flame-retardant synergists, and like modifiers without departing from the scope of the invention, whether they are added before, during, or after spinning.

The following specific examples are intended to illustrate the invention without limiting the scope thereof.

EXAMPLE 1

In accordance with the present invention, the following recipe and technique were used to prepare a crystallizable vinylidene chloride polymer powder which can be incorporated into an acrylic fiber as a flame-retardant additive.

Initial Water Phase 1800 g distilled water
15 g AEROSOL MA80 emulsifier (80% active)
pH adjusted to 3.5 with acetic acid Reducing Agent 9.75 g HYDROSULFITE AWC in 1000 g aqueous solution
Feed rate=10 g/hr Initiator 13.5 g of 70% t-butyl hydroperoxide (TBHP) in 1000 g aqueous solution
Feed rate=10 g/hr Aqueous Emulsifier Stream 236 g DOWFAX 2A1 emulsifier (45% active) in 1600 g aqueous solution
Used 800 g in 20 hours (Feed rate=40 g/hr)

Monomers for Seed Latex 50 g acrylonitrile (VCN)
450 g vinylidene chloride (VDC)
Used 150 g in seed latex reaction

First Monomer Mixture 200 g VCN
3800 g VDC
Used 2500 g in 20 hours (Feed rate=125 g/hr)

Polyfunctional Monomer 85 g 1,3-butadiene added at end of monomer feeding

Second Monomer Mixture 315 g methyl acrylate
1785 g VCN
Used 375 g in 3 hours (Feed rate=125 g/hr)

The initial water phase was introduced into a two-gallon reactor and placed under a vacuum of about 25 inch Hg for 10 minutes while being heated to 40° C. with agitation at 100 rpm. When the water phase had reached a temperature of about 40° C., the vacuum was shut off and 150 g of seed latex monomer was introduced. Immediately, the reducing agent and initiator streams were introduced at 10 g/hr. When the seed latex reaction had proceeded to approximately 4 psi pressure drop from the maximum pressure achieved, introduction of the first monomer mixture at 125 g/hr and the emulsifier stream at 40 g/hr was begun and continued for 20 hours while concurrently pumping reducing agent and initiator each at 10 g/hr. After 20 hours of feeding the first monomer mixture, this stream was shut off and 85 g of butadiene was shot into the reactor. Within 15 minutes, pumping of the second monomer mixture was begun at 125 g/hr while continuing to feed emulsifier at 40 g/hr and the reducing agent and initiator each at 10 g/hr. The second monomer mixture feed and the emulsifier stream were shut off after 3 hours and the initiator and reducing agent were pumped for 3 additional hours at 10 g/hr each to complete the reaction. The latex was cooled to room temperature to prepare for polymer recovery.

The polymer was recovered from the latex by a common coagulation method: 7000 ml water and 35 g alum were mixed and heated to 50° C. Then, with vigorous agitation, the 2700 ml latex was slowly added and the temperature was raised to 70° C. and held at that temperature for five minutes. The mixture of water, alum, and polymer crumb was then rapidly cooled in ice and the wet polymer powder was collected in a centrifuge and washed with water for 10 minutes. Thereafter, the powder was air dried at room temperature.

EXAMPLE 2

The performance of a crystallizable vinylidene chloride polymer powder as a flame-retardant additive in an acrylic fiber was evaluated.

A spinning solution was prepared by first adding 148 g of the powder obtained in Example 1 to 650 g of dimethyl formamide and thoroughly mixing the ingredients at room temperature in a Tekmar Dispax high shear agitator. The mixture was then heated to 50° C. to ensure complete dispersion. The so-formed dispersion was slightly turbid, but uniform and relatively low in viscosity.

Next, 202 g of a fiber-forming polymer comprising a polymer used to prepare the commercial acrylic fiber CRESLAN® T61 was added and the mixture was stirred for 3 hours at a rate sufficient to maintain the temperature below 75° C. (no external heating was required).

The resulting spinning solution was spun into fibers using a spinning unit having a reservoir, pump, filter, and spinnerette. The spinnerette was immersed in a coagulation bath comprising a mixture of 16 parts water and 84 parts dimethyl formamide at about 25° C. The fibers were then passed over a wash roll, oriented under steam, and then relaxed under steam and gathered on a hot chrome roll at 105° C. and then wound on spools.

The resulting fibers, having been subjected to a net draw of 5.0, were tested for physical properties. For comparison, fibers prepared in a similar manner, but without the vinylidene chloride polymer additive were tested. The results of these tests are shown in Table I.

TABLE I

| Sample | Properties of a 30-Filament Yarn | | | | | | |
|---|---|---|---|---|---|---|---|
| | Percent Shrink | Overall Stretch Ratio | Denier Per Filament | Tenacity (g/denier) | Percent Elongation | Percent Chlorine | LOI |
| For Comparison | 16.5 | 5.0 | 2.90 | 3.94 | 14.9 | 0 | 17 |
| The Invention | 17.8 | 5.0 | 3.63 | 2.40 | 17.7 | 25 | 24 |

Note:
LOI = limiting oxygen index

The shrink test above was conducted by immersing the yarn in boiling water for 3 minutes and thereafter drying it without tension. Neither fiber had good shrinkage values, indicating that relaxation during the spinning process was poorly conducted. Nevertheless, the shrinkage values were very comparable. The limiting oxygen index (LOI) was measured by well known procedures.

It can be seen from these that the fibers of the present invention have enhanced flame-retardancy (as indicated by LOI measurements) without a substantial loss of other beneficial physical properties, as compared to fibers which do not contain crystallizable vinylidene chloride polymer powders. Similar good results are obtained by using any of the polymer powders within the scope of the present invention as hereinafter claimed.

What is claimed is:

1. A crystallizable vinylidene chloride polymer powder which can be incorporated in acrylic fibers as a flame-retardant additive, said powder being recovered from a latex obtained by emulsion polymerizing in sequence
    (a) a first monomer mixture comprising about 85 to about 95 weight percent vinylidene chloride and about 5 to about 15 weight percent of a copolymerizable ethylenically unsaturated comonomer;

(b) a minor amount of a polyfunctional comonomer for providing graft sites on the product of (a); and (c) about 10 to about 25 weight percent, based on the weight of the first monomer mixture, of a second monomer mixture comprising about 85 to about 95 weight percent acrylonitrile and about 5 to about 15 weight percent of a copolymerizable ethylenically unsaturated comonomer;

wherein the particles in the resulting latex have a diameter less than about 1 micron.

2. A powder according to claim 1 wherein the proportion of vinylidene chloride in the first monomer mixture ranges from about 90 to about 95 weight percent.

3. A powder according to claim 1 wherein the copolymerizable ethylenicaly unsaturated comonomer of (a) is selected from the group consisting of alkyl esters of acrylic and methacrylic acids and nitriles of ethylenically unsaturated carboxylic acids.

4. A powder according to claim 1 wherein the copolymerizable ethylenically unsaturated comonomer of (a) comprises acrylonitrile.

5. A powder according to claim 1 wherein the polyfunctional comonomer of (b) comprises a conjugated diolefinically unsaturated monomer.

6. A powder according to claim 1 wherein the amount of the polyfunctional comonomer of (b) ranges from about 1 to about 5 weight percent, based on the weight of the first monomer mixture.

7. A powder according to claim 1 wherein the polyfunctional comonomer comprises 1,3-butadiene.

8. A powder according to claim 1 wherein the amount of acrylonitrile in the second monomer mixture ranges from about 85 to about 90 weight percent.

9. A powder according to claim 1 wherein the ethylenically unsaturated comonomer of (c) is selected from the group consisting of alkyl esters of acrylic and methacrylic acids.

10. A powder according to claim 1 wherein the particles in the resulting latex have a diameter in the range of about 0.1 to about 0.5 micron.

11. A spinning solution for the preparation of flame-retardant acrylic fibers comprising
(a) a fiber-forming polymer containing at least 85 weight percent acrylonitrile;
(b) a solvent for the fiber-forming polymer; and
(c) a crystallizable vinylidene chloride polymer powder according to claim 1.

12. A process for forming the spinning solution of claim 11 which comprises
(a) forming a generally uniform dispersion of the solvent and the crystallizable vinylidene chloride polymer powder; and
(b) admixing the fiber-forming polymer with the so-formed dispersion.

13. An acrylic fiber obtained by spinning the solution of claim 11.

* * * * *